United States Patent [19]
Oda et al.

[11] Patent Number: 6,026,668
[45] Date of Patent: Feb. 22, 2000

[54] ELECTRICALLY-POWERED CUTTING AND BENDING MACHINE

[75] Inventors: Hiroyuki Oda, Mito; Chikai Yoshimizu, Ibaraki; Eiji Nakayama, Hitachinaka, all of Japan

[73] Assignee: Hitachi Koki Co., Ltd., Tokyo, Japan

[21] Appl. No.: 09/307,723

[22] Filed: May 10, 1999

[30] Foreign Application Priority Data

May 15, 1998 [JP] Japan .................................. 10-133378

[51] Int. Cl.[7] .................................................. B21D 7/024
[52] U.S. Cl. ............................. 72/217; 72/387; 83/602
[58] Field of Search ........................... 72/217, 218, 294, 72/307, 321, 387, 398; 83/602, 674; 30/228, 245, 247, 249

[56] References Cited

U.S. PATENT DOCUMENTS

| | | | |
|---|---|---|---|
| 3,447,353 | 6/1969 | Noveske | 72/217 |
| 3,448,602 | 6/1969 | Stanley et al. | 72/217 |
| 3,584,492 | 6/1971 | Dodge | 72/217 |
| 4,052,875 | 10/1977 | Sakamoto | 72/217 |
| 4,223,543 | 9/1980 | Sakamoto | 72/30 |
| 4,785,650 | 11/1988 | Lusty | 72/217 |
| 5,044,188 | 9/1991 | Nonaka | 72/217 |
| 5,203,192 | 4/1993 | Kimura | 72/217 |
| 5,284,040 | 2/1994 | Beelen et al. | 72/157 |
| 5,931,039 | 8/1999 | Yoshimizu et al. | 72/217 |

FOREIGN PATENT DOCUMENTS

| | | | |
|---|---|---|---|
| 3123558 | 1/1983 | Germany | 72/217 |
| 4-157023 | 5/1992 | Japan | 72/217 |
| 4-262824 | 9/1992 | Japan . | |
| 10-166063 | 6/1998 | Japan . | |

*Primary Examiner*—David Jones
*Attorney, Agent, or Firm*—Louis Woo

[57] ABSTRACT

A cylindrical sleeve and a reaction force receiver are fixed on a ceiling plate so as to form a passage along which a rod-like member is placeable and bent by a bending pin rotating about an output shaft driven by an electric motor through a speed-reduction gear train. A wall is formed in parallel with a front end surface of the reaction force receiver in an opposed relationship with each other. A plurality of surfaces, formed on the front end of the reaction force receiver, are inclined with each other. The rod-like member is supported along one of the plurality of surfaces.

9 Claims, 7 Drawing Sheets

ELECTRICALLY-POWERED CUTTING AND BENDING MACHINE

BACKGROUND OF THE INVENTION

The present invention relates to an electrically-powered cutting and bending machine used for cutting and bending various rod-like members, such as reinforcement rods or pipes made of steel or other metallic materials.

In the following description, an electrically-powered cutting and bending machine is used for cutting and bending the reinforcement rods having a diameter of 13 mm or less.

FIGS. 9 and 10 show a typical bending machine conventionally used for bending various reinforcement rods (refer to Unexamined Japanese patent publication No. 4-262824).

According to this conventional bending machine, the reinforcement rod is held between a receiving sleeve 40 and a bending roller 41. The bending roller 41 is shiftable along an arc guide groove provided around the receiving sleeve 40. A reaction force receiver 32 is provided at an offset position in the vicinity of the receiving sleeve 40 and the bending roller 41. The reaction force receiver 32 supports the body of the reinforcement rod when the reinforcement rod is bent by the bending roller 41. The reaction force receiver 32 is equipped with a bolt 34. When the bolt 34 is loosened, the position of the reaction force receiver 32 is changeable along the line normal to the axial direction of the reinforcement rod. The reinforcement rod can be securely held during the bending operation by adequately adjusting the position of the reaction force receiver 32, regardless of the rod size.

However, the operability of the above-described conventional bending machine is significantly worsened due to the time-consuming adjustment of the position of the reaction force receiver 32 accomplished by loosening and tightening the bolt 34 every time.

Furthermore, this conventional bending machine is not equipped with any special mechanism for preventing the machine from being abused for excessively large reinforcement rods.

Moreover, this conventional bending machine requires a special measuring device for checking a resultant bending angle of the reinforcement rod being bent by the bending roller 41.

SUMMARY OF THE INVENTION

An object of the present invention is to provide an improved reinforcement rod bending machine capable of resolving the above-described problems of the conventional bending machine.

Another object of the present invention is to provide an improved reinforcement rod bending machine which is non-expensive, easy to operate, light in weight, and reliable in safety.

In order to accomplish this and other related objects, one aspect of the present invention provides an electrically-powered bending apparatus comprising an electric motor. A speed-reduction gear train is connected to a rotary shaft of the electric motor. The rotation speed of the motor is reduced through this speed-reducing gear train. The speed-reduction gear train is accommodated in a gear casing. An output shaft is driven by the speed-reduction gear train. A bending pin is integrally formed with the output shaft in an offset relationship. The bending pin is rotatable about the output shaft in accordance with the rotation of the output shaft. A ceiling plate is provided on the gear casing. A cylindrical sleeve and a reaction force receiver are fixed on the ceiling plate. A passage is formed between the cylindrical sleeve and the reaction force receiver. A rod-like member is placeable in this passage and bent by the bending pin rotating about the output shaft. A wall is formed in parallel with a surface formed on the front end of the reaction force receiver in an opposed relationship with each other.

According to this arrangement, it becomes possible to surely restrict the rod size of the rod-like member inserted between the cylindrical sleeve and the reaction force receiver. In other words, this arrangement makes it possible to prevent the machine from being damaged by a large-size reinforcement rod which may be erroneously set. No special expensive safety mechanism, such as a slip clutch, is required.

Another aspect of the present invention provides an electrically-powered bending apparatus comprising an electric motor. A speed-reduction gear train is connected to a rotary shaft of the electric motor. The rotation speed of the motor is reduced through this speed-reducing gear train. The speed-reduction gear train is accommodated in a gear casing. An output shaft is driven by the speed-reduction gear train. A bending pin is integrally formed with the output shaft in an offset relationship. The bending pin is rotatable about the output shaft in accordance with the rotation of the output shaft. A ceiling plate is provided on the gear casing. A cylindrical sleeve and a reaction force receiver are fixed on the ceiling plate. A passage is formed between the cylindrical sleeve and the reaction force receiver. A rod-like member is placeable in this passage and bent by the bending pin rotating about the output shaft. A plurality of surfaces, inclined with each other, are formed on the front end of the reaction force receiver. The rod-like member can be supported along one of the plurality of surfaces.

According to this arrangement, the reaction force receiver can support the reinforcement rod firmly along one of the plurality of surface having a significant length in the axial direction of the reinforcement rod. In other words, this arrangement makes it possible to prevent a large force from acting on a local spot on the reaction force receiver, thereby stably holding the reinforcement rod.

According to a preferred embodiment of the present invention, the ceiling plate has an angular scale indicating a resultant bending angle of the rod-like member which is bent by the bending pin.

Preferably, the angular scale is a combination of a calibration marking and a numeral representing the bending angle.

Preferably, the calibration marking is provided for each designated rod size of different kinds of rod-like members.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

A preferred embodiment of the present invention will be explained with reference to FIGS. 1–8 and 11–12.

Overall Arrangement

Figure 2:
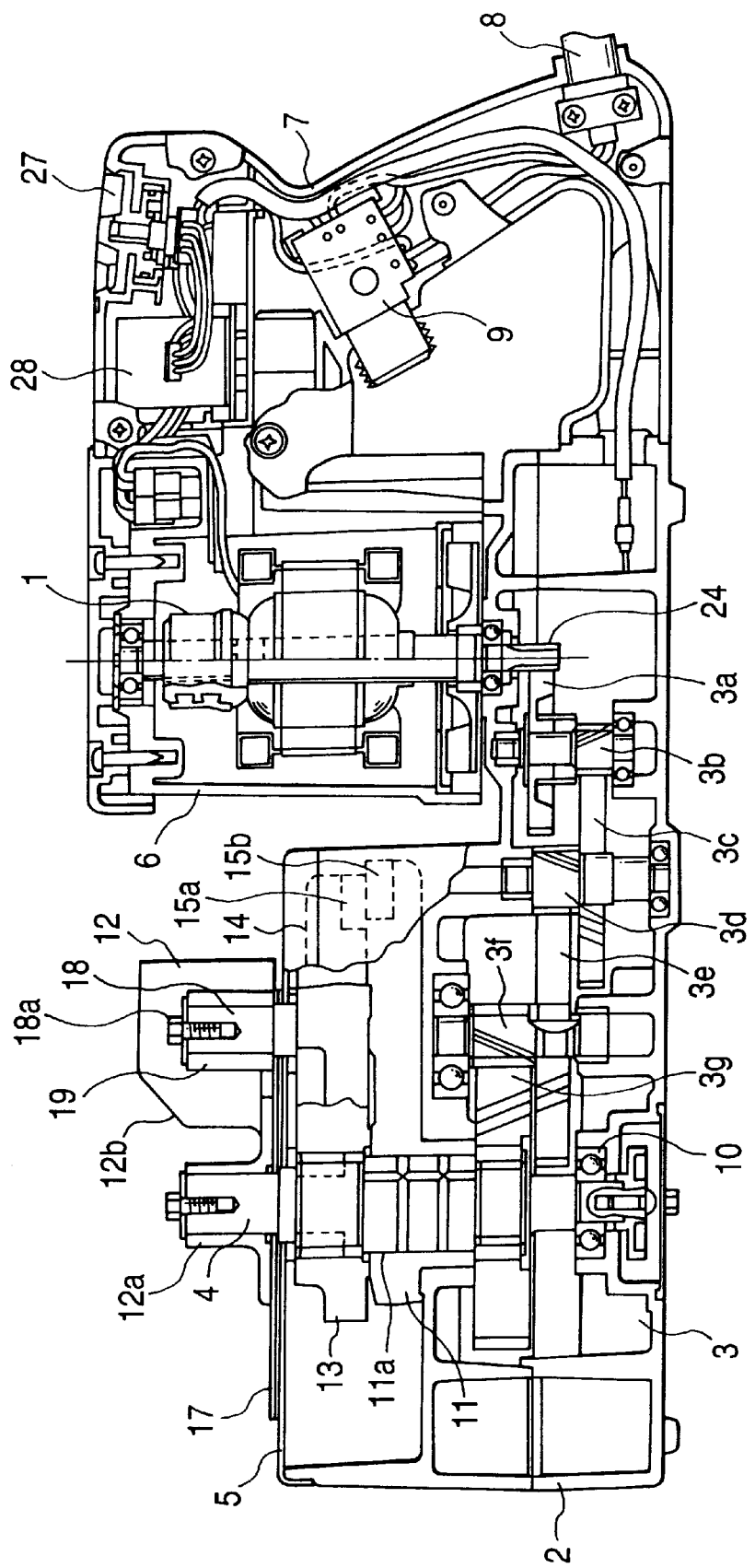
FIG. 2 is a partly sectional side view showing the electrically-powered cutting and bending machine shown in FIG. 1.

In FIG. 2, an electric motor 1 is accommodated in a resin housing 6. A ceiling plate 5 is located at one side of the machine body. A handle 7 is located at an opposite side of the machine body with respect to the housing 6. A cord 8 extends from a lower end of the handle 7. The handle 7 has in inside space for accommodating a switch 9 and a control circuit 28. The switch 9 opens and closes a power circuit for supplying electric power to the motor 1. These members cooperatively serve as a power source section.

A plurality of spur gears 3a to 3g, constituting a four-stage gear train, are provided at a bottom in an aluminum die-cast gear casing 2. The four-stage gear train reduces the rotational speed of the electric motor 1 down to a 1/1,000 level. An output shaft 4, driven by the final gear 3g of the four-stage gear train, has a lower portion supported by a bearing 10, an intermediate portion supported by a bearing 11a of a stationary member 11, and an upper portion supported by a cylindrical sleeve 12a of a center plate 12. These members cooperatively serve as a speed-reduction section.

Cutting Mechanism

Figure 6:
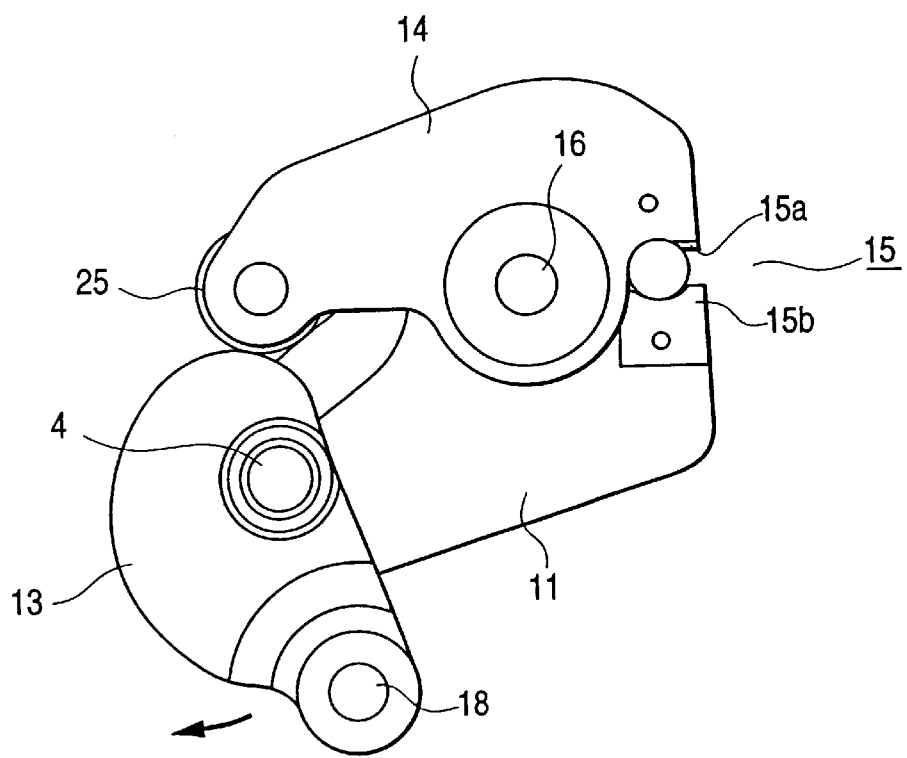
FIG. 6 is a side view showing an internal structure relating to the cutting mechanism of the electrically-powered cutting and bending machine in accordance with the preferred embodiment of the present invention.

FIG. 6 shows a stationary plate 11 securely fixed on the gear casing 2. A pivot 16 is press fitted into an engaging bore of the stationary plate 11. A swing arm 14, supported around the pivot 16, is swingable about the pivot 16. A roller 25 is rotatably supported at a distal end of the swing arm 14. The roller 25, serving as a cam follower, is brought into contact with a sectorial cam 13 located in the vicinity of the swing arm 14. The sectorial cam 13 is integrally or separably formed with the output shaft 4 of the speed-reduction section. A cutting blade (hereinafter referred to as a movable cutting blade) 15a is provided at the opposite side of the swing arm 14 with respect to the pivot 16. The movable cutting blade 15a faces a stationary cutting blade 15b provided at an opposed end of the stationary plate 11. The movable cutting blade 15a and the stationary cutting blade 15b cooperatively constitute a scissors-like cutting mechanism for cutting a reinforcement rod 26.

Bending Mechanism

The center plate 12, a bending pin 18 and a bending roller 19 are provided on a disk plate 17 so as to cooperate as a bending mechanism. The disk plate 17 is located on the ceiling plate 5. The ceiling plate 5 is a steel plate fixed on the upper surface of the gear casing 2. The thickness of the ceiling plate 5 is approximately 2 mm. A total of five calibrations are provided at equal angular intervals of 45° along the circumferential periphery of the ceiling plate 5. Numerals 30, i.e., 0°, 45°, 90°, 135° and 180°, represent the bending angles, respectively. Two different calibration markings 20 and 21, each representing the bending angle, are provided near the corresponding numeral 30. One calibration marking 20 is for the reinforcement rod 26 of $\phi=13$ mm, and the other calibration marking 21 for the reinforcement rod 26 of $\phi=10$ mm. The bending pin 18 is press fitted into an engaging bore of the sectorial cam 13 at an offset portion spaced from the output shaft 4. A bending roller 19 is rotatably coupled around the bending pin 18. A bolt 18a, screwed into a bore on the top of the bending pin 18, prevents the bending roller 19 from being pulled out in the axial direction.

Figure 11:
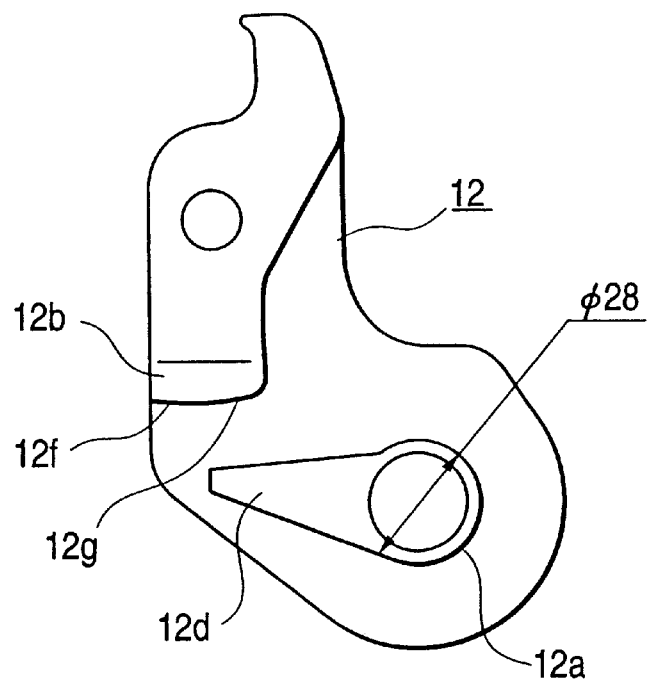
FIG. 11 is a plan view showing a center plate of the electrically-powered cutting and bending machine in accordance with the preferred embodiment of the present invention.

The center plate 12 has two engaging holes into which the output shaft 4 and the pivot 16 are inserted. Two fastening screws 35 and 36 are used to detachably fix the output shaft 4 and the pivot 16, respectively. The output shaft 4 is supported at two different axial portions by the stationary member 11 and the center plate 12. The output shaft 4 extends in the direction normal to the plane surface of sectorial cam 13 interposed between the stationary member 11 and the center plate 12. Similarly, the pivot 16 is supported at two different axial portions by the stationary member 11 and the center plate 12. The pivot 16 extends in the direction normal to the plane surface of the swing arm 14 interposed between the stationary member 11 and the center plate 12, The cylindrical sleeve 12a, engaged with the upper portion of the output shaft 4, has a height higher than the diameter ($\phi=13$ mm) of the reinforcement rod 26 when this diameter ($\phi=13$ mm) is the allowable maximum size for this cutting and bending machine. In the bending operation, the reinforcement rod 26 is bent along the cylindrical surface of the cylindrical sleeve 12a. As shown in FIG. 11, the cylindrical sleeve 12a has an outer diameter ($\phi=28$ mm) larger than the diameter of the output shaft 4.

A reaction force receiver 12b is integrally formed with the center plate 12. The reaction force receiver 12b is formed at the front end of a protruding portion extending in a cantilever fashion from the main body of the center plate 12. An installation hole 12c of the pivot 16 is formed at the main body of the center plate 12. The reaction force receiver 12b receives a reaction force acting from the reinforcement rod 26 during the bending operation.

A wall 12d is formed integrally with the center plate 12 so as to oppose to the reaction force receiver 12b. The wall 12d has a height of approximately 25 mm. The wall 12d is substantially parallel to the front surface of the reaction force receiver 12b, so as to provide a passage 12e with a gap "W" between the wall 12d and the reaction force receiver 12b. The gap "W" is slightly larger than the outer diameter ($\phi$=13 mm) of the reinforcement rod 26 and smaller than a diameter ($\phi$=16 mm) of a one-rank larger reinforcement rod which is not allowed to bend by using this cutting and bending machine.

The surface of the reaction force receiver 12b is divided into two different surfaces 12f and 12g which are inclined from each other by an angle of approximately 4°.

Cutting Operation

The above-described cutting and bending machine performs a cutting operation of the reinforcement rod 26 in the following manner.

Figure 7:
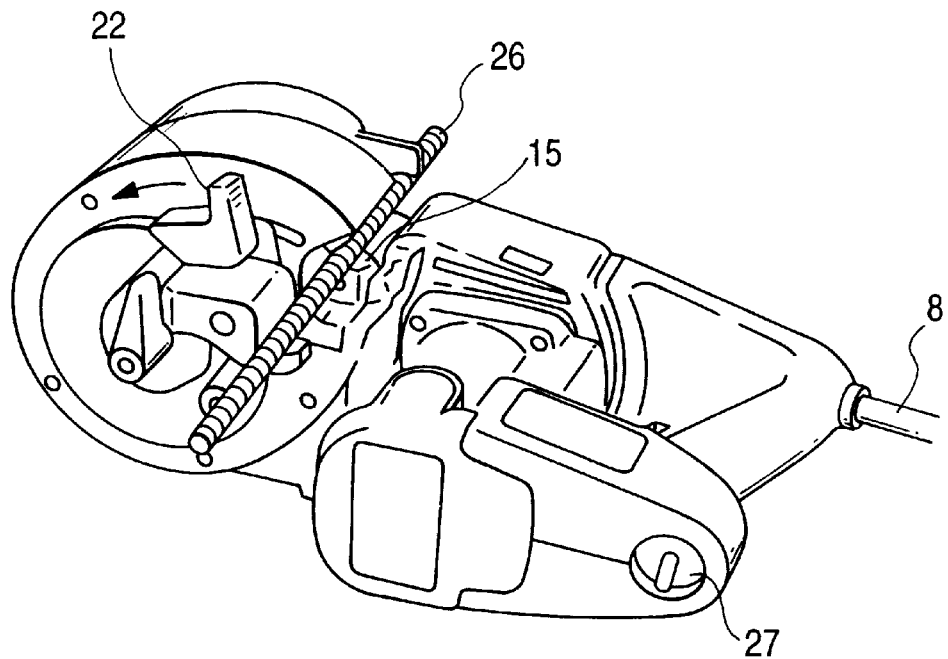
FIG. 7 is a perspective view showing a cutting operation of the electrically-powered cutting and bending machine in accordance with the preferred embodiment of the present invention.

As shown in FIG. 7, the cutting and bending machine is placed on the ground so that the cutting blades 15a and 15b are positioned at an upper position. Then, a lever 22 is pulled in a counterclockwise direction along a black arrow. In accordance with the turning movement of the lever 22, a safety cover 23 is rotated in the same direction so as to uncover the cutting blades 15a and 15b. Then, the reinforcement rod 26 is held between the cutting blades 15a and 15b.

The cord 8 is connected to the power source terminal. The operator depresses the switch 9 while gripping the handle 7. A rotary shaft 24 of the moor 1 starts rotating at a high speed of approximately 18,000 rpm. The rotational speed of the rotary shaft 24 is decreased to a reduced level of approximately 18 rpm through the plurality of spur gears 3a to 3g constituting the four-stage gear train. The output shaft 4 rotates at the reduced speed of approximately 18 rpm. The sectorial cam 13, integrally or separably formed with the output shaft 4, is brought into contact with the roller 25 rotatably provided at the distal end of the swing arm 14. The roller 25 is lifted upward along the cam profile of the sectorial cam 13 in accordance with the rotation of the output shaft 4 as shown in FIG. 6. The swing arm 14 is thus swung in the clockwise direction about the pivot 16. In other words, the movable cutting blade 15a approaches the opposing stationary cutting blade 15b so as to reduce the clearance between the cutting blades 15a and 15b. Thus, the reinforcement rod 26 is cut by the closed cutting blades 15a and 15b. In this case, the cutting blades 15a and 15b cooperatively produce a cutting force reaching a level of approximately 6,000 kg.

Bending Operation

Figure 1:
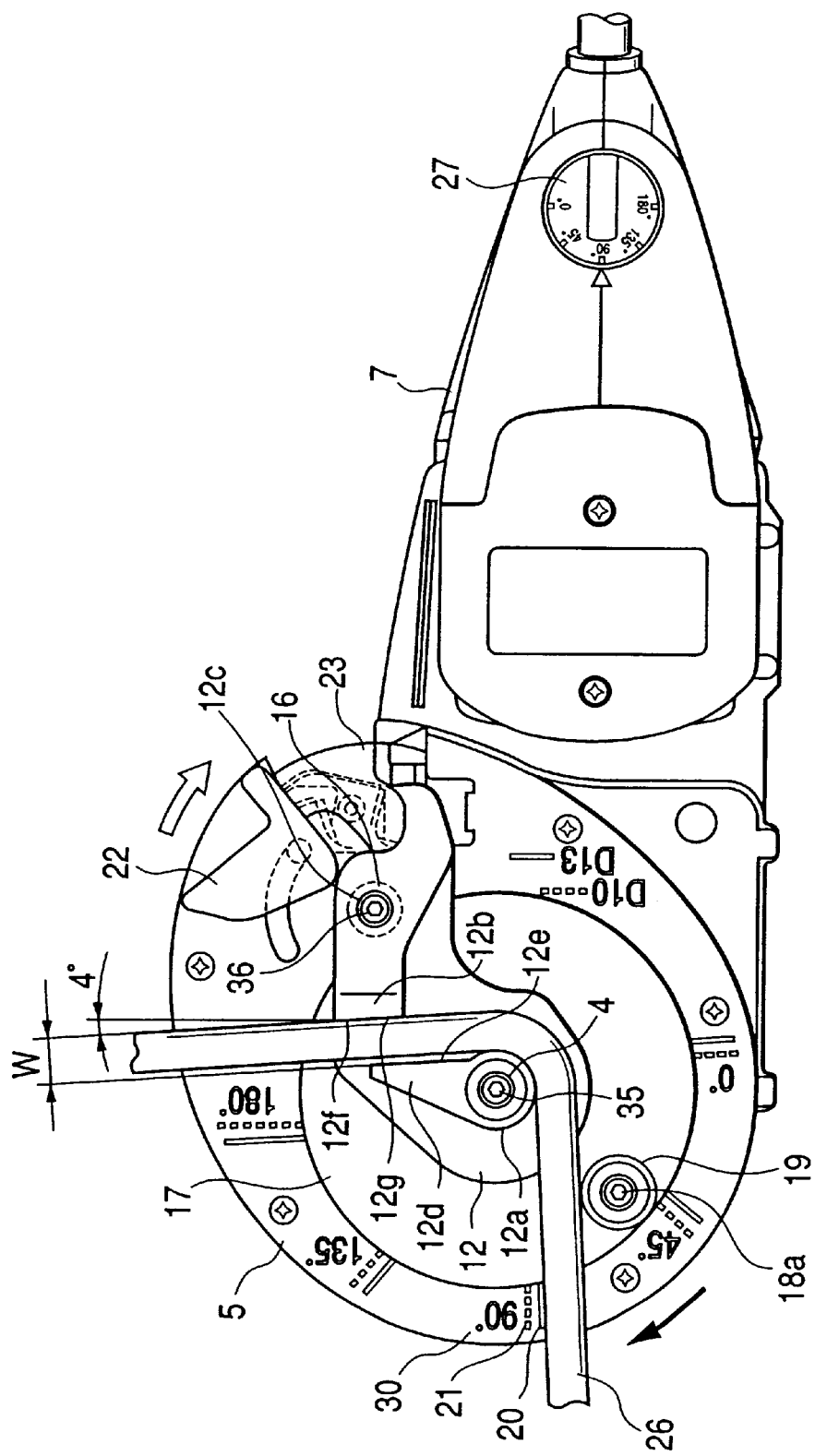
FIG. 1 is a plan view showing an electrically-powered cutting and bending machine in accordance with a preferred embodiment of the present invention.
Figure 8:
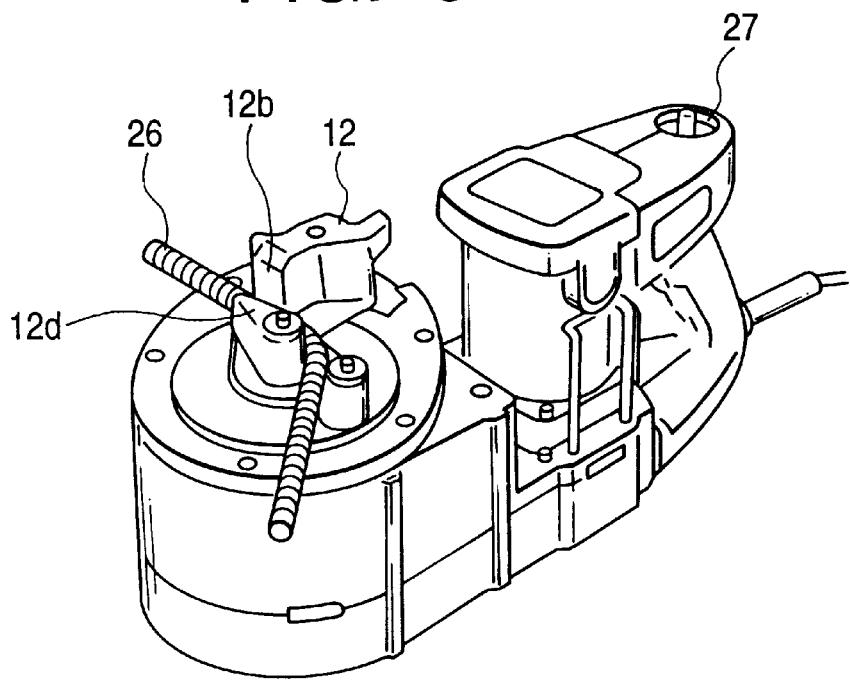
FIG. 8 is a perspective view showing a bending operation of the electrically-powered cutting and bending machine in accordance with the preferred embodiment of the present invention.
Figure 9:
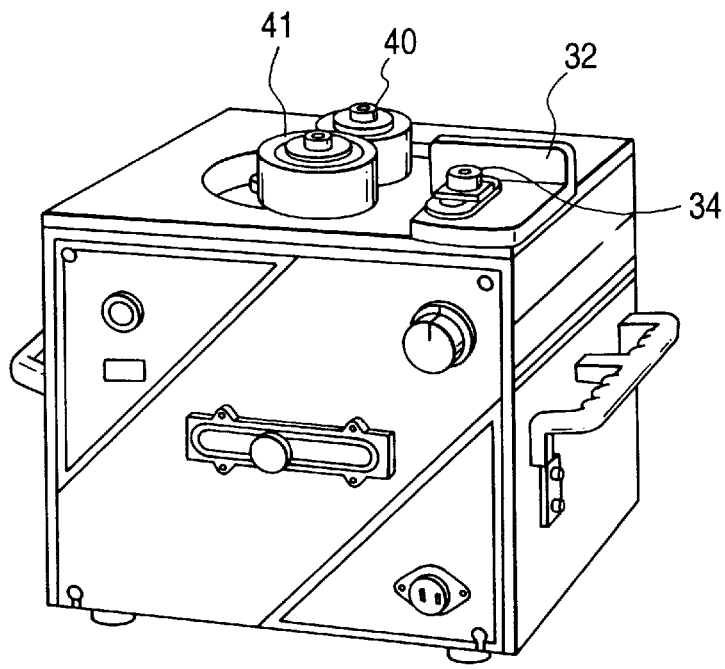
FIG. 9 is a perspective view showing a conventional bending machine.
Figure 10:
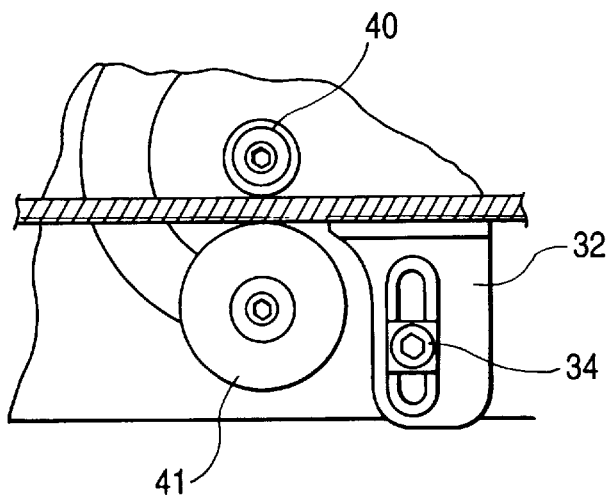
FIG. 10 is a plan view showing a reaction force receiving arrangement of the conventional bending machine shown in FIG. 9.

FIG. 8 shows a bending operation of the electrically-powered cutting and bending machine, where the machine is turned 90° from the above-described position of the cutting operation. The lever 22 is rotated in the clockwise direction along a white arrow as shown in FIG. 1. The passage 12e is opened between the cylindrical sleeve 12a and the reaction force receiver 12b. The reinforcement rod 26 is placed in the passage 12e so that the reinforcement rod 26 is held between the cylindrical sleeve 12a and the reaction force receiver 12b.

Then, the switch 9 is depressed to rotate the output shaft 4 in the same manner as in the above-described cutting operation. The bending pin 18 provided on the cam 13 rotates about the output shaft 4 in the clockwise direction along the black arrow shown in FIG. 1. The bending roller 19, rotatably coupled around the bending pin 18, rotates in the clockwise direction together with the bending pin 18. In this case, the disk plate 17 rotates in the clockwise direction together with the bending pin 18. The reinforcement rod 26, held between the cylindrical sleeve 12a and the reaction force receiver 12b, is bent about the cylindrical sleeve 12a by the bending pin 18 within a predetermined angular zone.

An angular adjustment dial 27, provided at a head portion of the handle 7, is used to set a bending angle. The electrically-powered cutting and bending machine can produce a bending torque of approximately 18 kgm. The angular adjustment dial 27 is connected to the control circuit 28. The control circuit 28 activates the motor 1 in accordance with the designated bending angle being set by the angular adjustment dial 27. When the bending angle of the reinforcement rod 26 reaches the set angle, the control circuit 28 stops the motor 1. Then, the control circuit 28 controls the motor to rotate in the reverse direction to return the bending pin 18 to the initial position.

Function of Wall 12d

Figure 5:
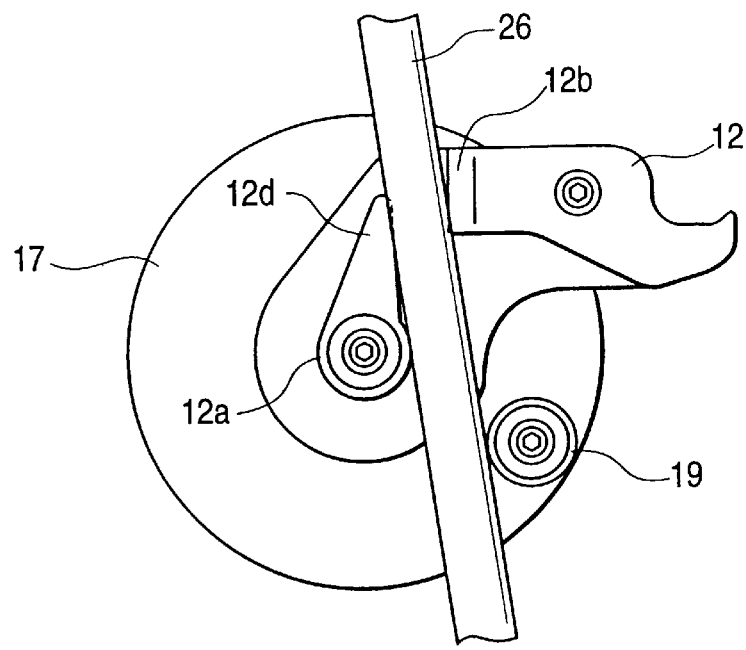
FIG. 5 is a plan view explaining the function of a wall in accordance with the preferred embodiment of the present invention.

As shown in FIG. 5, the wall 12d restricts the size of the reinforcement rod 26 being set in the passage 12e between the cylindrical sleeve 12a and the reaction force receiver 12b. If the reinforcement rod 26 has a large size (e.g., $\phi$=16 mm) exceeding the maximum bending ability of this machine, the reinforcement rod 26 cannot be set in the passage 12e by the presence of the wall 12d. This arrangement makes it possible to prevent the machine from being damaged by a large-size reinforcement rod which may be erroneously set. No special expensive safety mechanism, such as a slip clutch, is required.

Function of Reaction Force Receiver 12b

Figure 3:
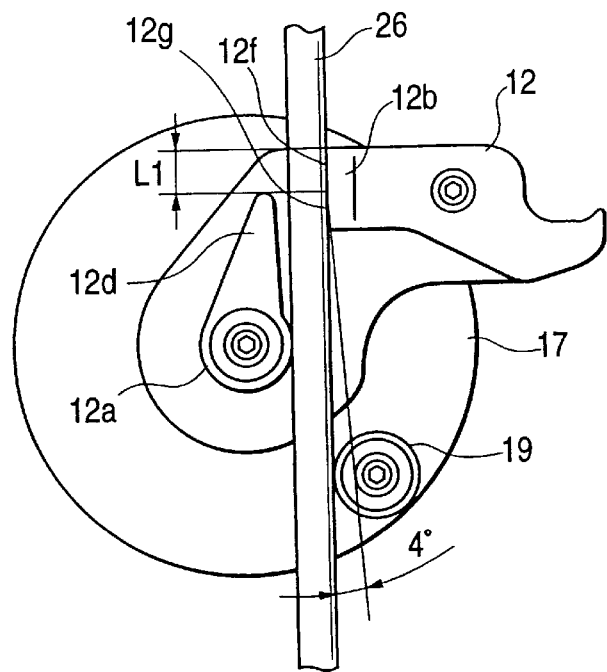
FIG. 3 is a plan view explaining the function of a reaction force receiver in accordance with the preferred embodiment of the present invention.

FIG. 3 shows the reinforcement rod 26 of $\phi$=10 mm being set in the passage 12e between the cylindrical sleeve 12a and the reaction force receiver 12b. In this case, the reinforcement rod 26 of $\phi$=10 mm is supported by the surface 12f (length L1) formed on the reaction force receiver 12b.

Figure 4:
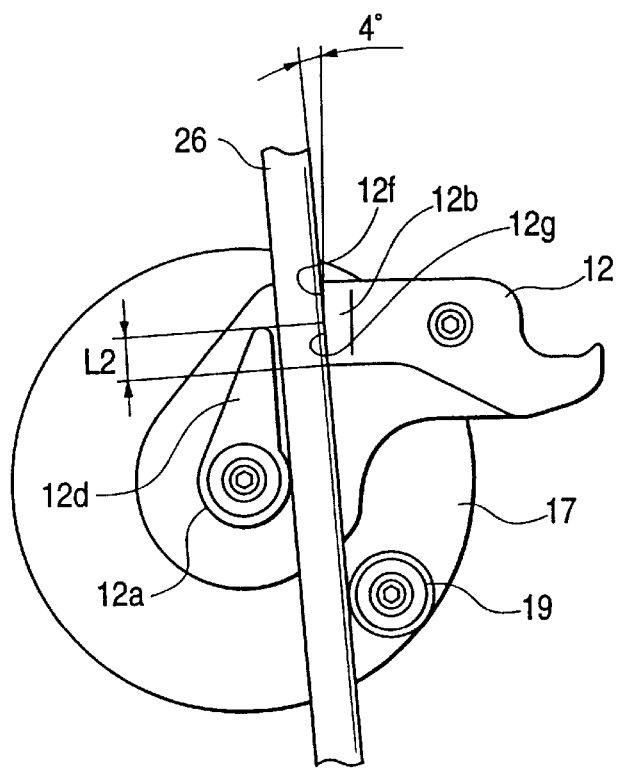
FIG. 4 is a plan view explaining the function of the reaction force receiver in accordance with the preferred embodiment of the present invention.

FIG. 4 shows the reinforcement rod 26 of $\phi$=13 mm being set in the passage 12e between the cylindrical sleeve 12a and the reaction force receiver 12b. In this case, the reinforcement rod 26 of $\phi$=13 mm is supported by the surface 12g (length L2) formed on the reaction force receiver 12b. The reaction force receiving surfaces 12f and 12g are inclined from each other by the angle of approximately 4°, as described above. Thus, the setting direction of the reinforcement rod 26 of $\phi$=13 mm is inclined approximately 4° from the axial direction of reinforcement rod 26 of $\phi$=10 mm.

In both cases, the reaction force receiver 12b can support the reinforcement rod 26 firmly along the surface 12f or 12g having the length L1 or L2 in the axial direction of the reinforcement rod 26. This arrangement makes it possible to prevent a large force from acting on a local spot on the reaction force receiver 12b, thereby stably holding the reinforcement rod 26.

Ceiling Plate 5

To realize a reliable bending operation of the reinforcement rod 26, it is generally necessary to perform the fine adjustment of bending angle. For example, the bending operation of the reinforcement rod 26 of $\phi$=13 mm is performed in the following manner.

The operator may select 90° by rotating the angular adjustment dial 27. In this case, the electric motor 1 drives the bending pin 18 in the clockwise direction so that the inner periphery of the reinforcement rod 26 reaches the calibration marking 20 corresponding to the numeral 30 indicating the bending angle 90°.

When the inside periphery of the reinforcement rod 26 does not agree with the calibration marking 20, the operator can perform the fine adjustment by turning the angular adjustment dial 27.

The bending operation of the reinforcement rod 26 of φ=10 mm is performed in the same manner. In this case, the reinforcement rod 26 is bent so that the inner periphery of the reinforcement rod 26 reaches the other calibration marking 21 corresponding to the numeral 30 indicating the bending angle 90°.

Providing the ceiling plate 5 with the scale, i.e., the calibration markings 20 and 21 and the numeral 30, makes it easy for the operator to visually check the bending angle of the reinforcement rod 26 being bent by the bending pin 18. No additional measuring device is required.

The calibration markings 20 and 21 are not limited to the scratched, notched or embossed lines as disclosed in this embodiment, and therefore can be replaced by any other discriminable indicia such as an adhesive seal or printed pattern.

Figure 12:
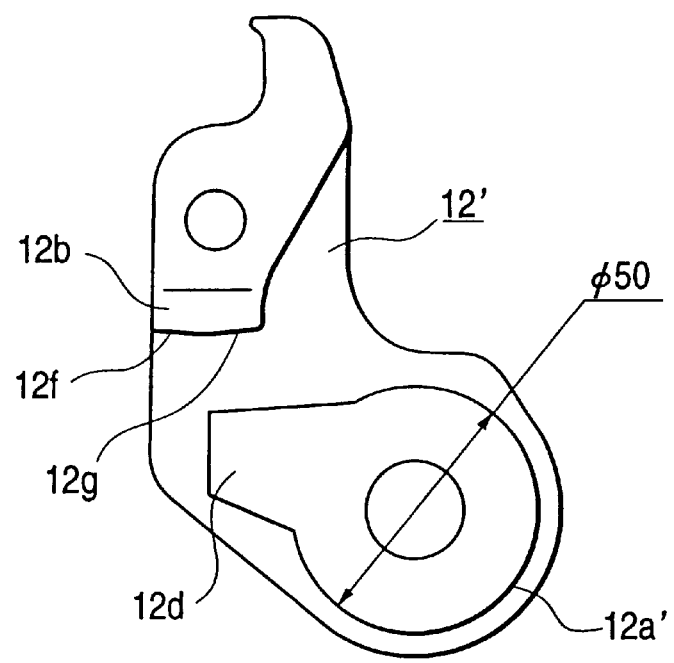
FIG. 12 is a plan view showing another center plate of the electrically-powered cutting and bending machine in accordance with the preferred embodiment of the present invention.

FIG. 12 shows another center plate 12' in accordance with the present invention. The center plate 12' has an enlarged cylindrical sleeve 12a' (φ=50 mm). This center plate 12' is used when the required bending curvature of the reinforcement rod 26 is changed from φ=28 mm to φ=50 mm. The rest of the arrangement of the center plate 12' is substantially the same as that of the center plate 12 shown in FIG. 11. These central plates 12 and 12' are easily exchangeable.

The number of the plural surfaces 12f and 12g formed on the front end of the reaction force receiver 12b is not limited to two and, therefore, should be determined appropriately according to the rod size of the reinforcement rods 26 processible by this cutting and bending machine.

What is claimed is:

1. An electrically-powered bending apparatus comprising:
   an electric motor;
   a speed-reduction gear train connected to a rotary shaft of said electric motor for producing a reduced rotation;
   a gear casing accommodating said speed-reduction gear train;
   an output shaft driven by said speed-reduction gear train;
   a bending pin integrally formed with said output shaft in an offset relationship so as to be rotatable about said output shaft in accordance with the rotation of said output shaft;
   a ceiling plate provided on said gear casing;
   a cylindrical sleeve and a reaction force receiver fixed on said ceiling plate so as to form a passage along which a rod-like member is placeable and bent by said bending pin rotating about said output shaft; and
   a wall positioned substantially perpendicular to said ceiling plate to form a parallel and opposed relationship with a front surface of said reaction force receiver, thereby restricting the rod size of said rod-like member inserted between said cylindrical sleeve and said reaction force receiver.

2. The electrically-powered bending apparatus in accordance with claim 1, wherein said ceiling plate has an angular scale indicating a resultant bending angle of said rod-like member which is bent by said bending pin.

3. The electrically-powered bending apparatus in accordance with claim 2, wherein said angular scale is a combination of a calibration marking and a numeral representing the bending angle.

4. The electrically-powered bending apparatus in accordance with claim 3, wherein said calibration marking is provided for each designated rod size of different kinds of rod-like members.

5. An electrically-powered bending apparatus comprising:
   an electric motor;
   a speed-reduction gear train connected to a rotary shift of said electric motor for producing a reduced rotation;
   a gear casing accommodating said speed-reduction gear train;
   an output shaft driven by said speed-reduction gear train;
   a bending pin integrally formed with said output shaft in an offset relationship so as to be rotatable about said output shaft in accordance with the rotation of said output shaft;
   a ceiling plate provided on said gear casing;
   a cylindrical sleeve and a reaction force receiver fixed on said ceiling plate so as to form a passage along which a rod-like member is placeable and bent by said being pin rotating about said output shaft; and
   a plurality of surfaces inclined with each other and formed on a front end of said reaction force receiver, so that said rod-like member can be supported along one of said plurality of surfaces.

6. The electrically-powered bending apparatus in accordance with claim 5, wherein said ceiling plate has an angular scale indicating a resultant bending angle of said rod-like member which is bent by said bending pin.

7. The electrically-powered bending apparatus in accordance with claim 6, wherein said angular scale is a combination of a calibration marking and a numeral representing the bending angle.

8. The electrically-powered bending apparatus in accordance with claim 7, wherein said calibration marking is provided for each designated rod size of different kinds of rod-like members.

9. An electrically-powered bending apparatus comprising:
   an electric motor;
   a speed-reduction gear train connected to a rotary shaft of said electric motor for producing a reduced rotation;
   a gear casing accommodating said speed-reduction gear train;
   an output shaft driven by said speed-reduction gear train;
   a bending pin integrally formed with said output shaft in an offset relationship so as to be rotatable about said output shaft in accordance with the rotation of said output shaft;
   a ceiling plate provided on said gear casing;
   a cylindrical sleeve and a reaction force receiver fixed on said ceiling plate so as to form a passage along which a rod-like member is placeable and bend by said bending pin rotating about said output shaft; and
   a wall positioned substantially perpendicular to said ceiling place to form a parallel and opposed relationship with a front surface of said reaction force receiver, so as to provide a stationary gap between said wall and the front surface of said reaction force receiver which is slightly larger than a maximum width of said rod-like member.

\* \* \* \* \*